United States Patent
Song (10) Patent No.: US 12,338,883 B2
(45) Date of Patent: Jun. 24, 2025

(54) DRIFT DRIVING CONTROL METHOD AND SYSTEM OF ELECTRONIC LIMITED SLIP DIFFERENTIAL

(71) Applicant: HYUNDAI WIA CORPORATION, Gyeongsangnam-do (KR)

(72) Inventor: Hyeok Hun Song, Gyeonggi-do (KR)

(73) Assignee: HYUNDAI WIA CORPORATION, Gyeongsangnam-Do (KR)

( * ) Notice: Subject to any disclaimer, the term of this patent is extended or adjusted under 35 U.S.C. 154(b) by 248 days.

(21) Appl. No.: 18/079,540

(22) Filed: Dec. 12, 2022

(65) Prior Publication Data

US 2023/0182567 A1 Jun. 15, 2023

(30) Foreign Application Priority Data

Dec. 15, 2021 (KR) .................. 10-2021-0179623

(51) Int. Cl.
*F16H 48/36* (2012.01)
*B60K 23/04* (2006.01)
*F16H 48/20* (2012.01)

(52) U.S. Cl.
CPC ........ *F16H 48/36* (2013.01); *B60K 2023/043* (2013.01); *F16H 2048/205* (2013.01); *F16H 2048/207* (2013.01)

(58) Field of Classification Search
CPC ...... B60K 23/043; B60W 10/12; B60W 10/16
See application file for complete search history.

(56) References Cited

U.S. PATENT DOCUMENTS

| | | | |
|---|---|---|---|
| 8,301,341 B2 * | 10/2012 | Taguchi | B60W 30/18181 701/41 |
| 9,296,424 B2 * | 3/2016 | Cotgrove | B60T 8/17552 |
| 10,596,902 B2 * | 3/2020 | Lim | B60K 23/0808 |
| 10,773,708 B2 * | 9/2020 | Ruybal | B60K 6/52 |
| 11,279,230 B2 * | 3/2022 | O'Rourke | B60K 23/04 |
| 11,352,015 B2 * | 6/2022 | Collins | B60K 6/547 |
| 2020/0317046 A1 * | 10/2020 | Flaxman | B60K 17/16 |

FOREIGN PATENT DOCUMENTS

| | | |
|---|---|---|
| JP | 2528955 B2 | 8/1996 |
| JP | 2004142629 A | 5/2004 |
| JP | 2010025272 A | 2/2010 |
| KR | 10-1546629 | 8/2015 |

(Continued)

OTHER PUBLICATIONS

Korean Office Action dated Nov. 8, 2023.

*Primary Examiner* — James J Taylor, II
(74) *Attorney, Agent, or Firm* — Dickinson Wright PLLC (57) ABSTRACT

A drift driving control method and system of an electronic limited slip differential (e-LSD). The method and the system enable drift driving by controlling an e-LSD differential when drift driving is intended by a driver. Whether or not drift mode conditions are met on the basis of a driver's vehicle operating state and an output value reflecting a driving state of a vehicle is determined. When the drift mode conditions are met, control is performed so that drift driving is performed by causing the vehicle to be oversteered by increasing driving force of a turning outer wheel using the electronic limited slip differential and then maintaining simultaneous slipping of right and left wheels.

11 Claims, 4 Drawing Sheets

(56) References Cited

FOREIGN PATENT DOCUMENTS

| KR | 10-2019-0045968 | 5/2019 |
| KR | 10-2020-0120779 | 10/2020 |
| KR | 10-2020-0128813 | 11/2020 |
| KR | 1020180052983 A | 2/2023 |
| KR | 1020190127433 A | 5/2023 |

* cited by examiner

DRIFT DRIVING CONTROL METHOD AND SYSTEM OF ELECTRONIC LIMITED SLIP DIFFERENTIAL

CROSS REFERENCE TO RELATED APPLICATION

The present application claims priority of Korean Patent Application No. 10-2021-0179623 filed Dec. 15, 2021, the entire contents of which is incorporated herein for all purposes by this reference.

BACKGROUND

Field

The present disclosure relates generally to a drift driving control method and system of an electronic limited slip differential (e-LSD), wherein the method and system are configured to enable drift driving by controlling an electronic limited slip differential when drift driving is intended by a driver.

Description of the Related Art

In a vehicle without a limited slip differential (LSD), when wheel slip occurs due to a decrease in the contact force of a turning inner wheel during turning, the driving force of a turning outer wheel decreases due to characteristics of a differential, and understeering occurs.

An electronic limited slip differential (e-LSD) suitably distributes torque to vehicle wheels according to a turning direction and amounts of wheel slip after determining the driving state of a vehicle and the intention of a driver.

Thus, when a vehicle provided with an e-LSD turns, the e-LSD may be controlled to improve the stability of the turning. The control process includes determining understeering, oversteering, or the like and applying control torque within allowable driving force of driving wheels, thereby restricting wheel slip in the transverse direction and inducing neutral steering.

However, we have discovered that when a driver is performing a drift driving operation in a rear wheel drive vehicle provided with an e-LSD, driving force exceeding allowable driving force of driving wheels cannot be transferred. Thus, drift driving is restricted, and thus driver's intention for drift driving may not be properly reflected, which can be problematic.

The foregoing is intended merely to aid in the understanding of the background of the present disclosure, and is not intended to mean that the present disclosure falls within the purview of the related art that is already known to those skilled in the art.

SUMMARY OF THE DISCLOSURE

Accordingly, the present disclosure has been made keeping in mind the above problems occurring in the related art, and the present disclosure is intended to propose a drift driving control method and system of an electronic limited slip differential (e-LSD), wherein the method and system are configured to enable drift driving by controlling an e-LSD differential when drift driving is intended by a driver.

In order to achieve the above objective, according to one aspect of the present disclosure, there is provided a drift driving control method of an electronic limited slip differential. The method may include: determining, by a controller, whether or not drift mode conditions are met on the basis of a driver's vehicle operating state and an output value reflecting a driving state of a vehicle; and when the drift mode conditions are met, controlling, by the controller, drift driving to be performed by causing the vehicle to be oversteered by increasing driving force of a turning outer wheel using the electronic limited slip differential and then maintaining simultaneous slipping of right and left wheels.

A drift mode may be categorized as a drift entrance mode and a drift maintaining mode. A normal driving mode may be converted to the drift entrance mode or transitions between the drift entrance mode, and the drift maintaining mode may be performed according to a result of the determination of whether the drift mode conditions are met.

When the drift mode conditions based on a driving mode, a steering state, a brake operating state, an accelerator opening degree, or a difference between an average front wheel speed and an average rear wheel speed of the vehicle are met, the drift entrance mode may be entered.

When the drift mode condition based on the difference between the average front wheel speed and the average rear wheel speed and the accelerator opening degree is not met, cancellation of the drift mode may be delayed for a predetermined time.

When the drift mode condition based on a counter-steering state is met, the electronic limited slip differential may be controlled to be transited to the drift maintaining mode.

When the drift mode conditions based on the accelerator opening degree, the difference between the average front wheel speed and the average rear wheel speed, and the counter-steering state are met, the drift maintaining mode may be maintained.

When the drift mode condition based on the counter-steering state is not met, whether or not to enter the drift mode may be determined.

Drift entrance torque for causing the oversteering in the vehicle may be applied by means of the electronic limited slip differential in the drift entrance mode. Drift maintaining torque for maintaining simultaneous slipping of the right and left wheels may be applied by means of the e-LSD in the drift maintaining mode.

The drift entrance torque may be determined by the driving force, the accelerator opening degree, and a vehicle speed input to electronic limited slip differential.

The drift maintaining torque may be determined by a maximum value of the driving force input to the electronic limited slip differential and allowable driving force of the turning outer wheel, lateral acceleration, and a yaw rate error.

The drift entrance torque and the drift maintaining torque may be applied by limiting gradients thereof.

Yaw damping control of the electronic limited slip differential may be stopped in a drift mode state.

The drift mode may be cancelled when a brake is operated in the drift mode state.

According to another aspect of the present disclosure, there is provided a drift driving control system of an electronic limited slip differential. The drift driving control system may include: a determining part determining whether or not drift mode conditions are met on the basis of a driver's vehicle operating state and an output value reflecting a driving state of a vehicle; and a torque control part enabling drift driving to be performed by causing the vehicle to be oversteered by increasing driving force of a turning outer wheel by means of an electronic limited slip differential and then maintaining simultaneous slipping of right and left wheels when the drift mode conditions are met.

According to the present disclosure, according to the present disclosure, when a driver intends drift driving in a rear wheel drive vehicle, a control process may be performed to cause and maintain oversteering in the vehicle by applying suitable torque applied to the wheels of the vehicle by means of the e-LSD, thereby driving the vehicle by properly reflecting the intention of the driver for the drift driving.

Furthermore, when the drift is maintained, simultaneous slipping of the right and left wheels of the vehicle may be maintained to stably maintain the drift state. In addition, the distribution of torque in the transverse direction is adjusted according to the lateral movement of the vehicle, thereby reducing minute steering manipulation of the driver.

Moreover, vehicles provided with an e-LSD may enter and maintain drift driving more easily than a vehicle without an e-LSD. Accordingly, the product quality of vehicles in terms of sport driving may be improved.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Specific structural and functional descriptions of embodiments of the present disclosure disclosed herein are only for illustrative purposes of the embodiments of the present disclosure. The present disclosure may be embodied in many different forms without departing from the spirit and significant characteristics of the present disclosure. Therefore, the embodiments of the present disclosure are disclosed only for illustrative purposes and should not be construed as limiting the present disclosure.

Reference will now be made in detail to various embodiments of the present disclosure, specific examples of which are illustrated in the accompanying drawings and described below, since the embodiments of the present disclosure can be variously modified in many different forms. While the present disclosure will be described in conjunction with exemplary embodiments thereof, it is to be understood that the present description is not intended to limit the present disclosure to those exemplary embodiments. On the contrary, the present disclosure is intended to cover not only the exemplary embodiments, but also various alternatives, modifications, equivalents and other embodiments that may be included within the spirit and scope of the present disclosure as defined by the appended claims.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to", should be construed in the same way.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations thereof but do not preclude the presence or addition of one or more other features, integers, steps, operations, elements, components, and/or combinations thereof.

Unless otherwise defined, all terms including technical and scientific terms used herein have the same meaning as commonly understood by those skilled in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, exemplary embodiments of the present disclosure will be described with reference to the accompanying drawings.

Figure 1:
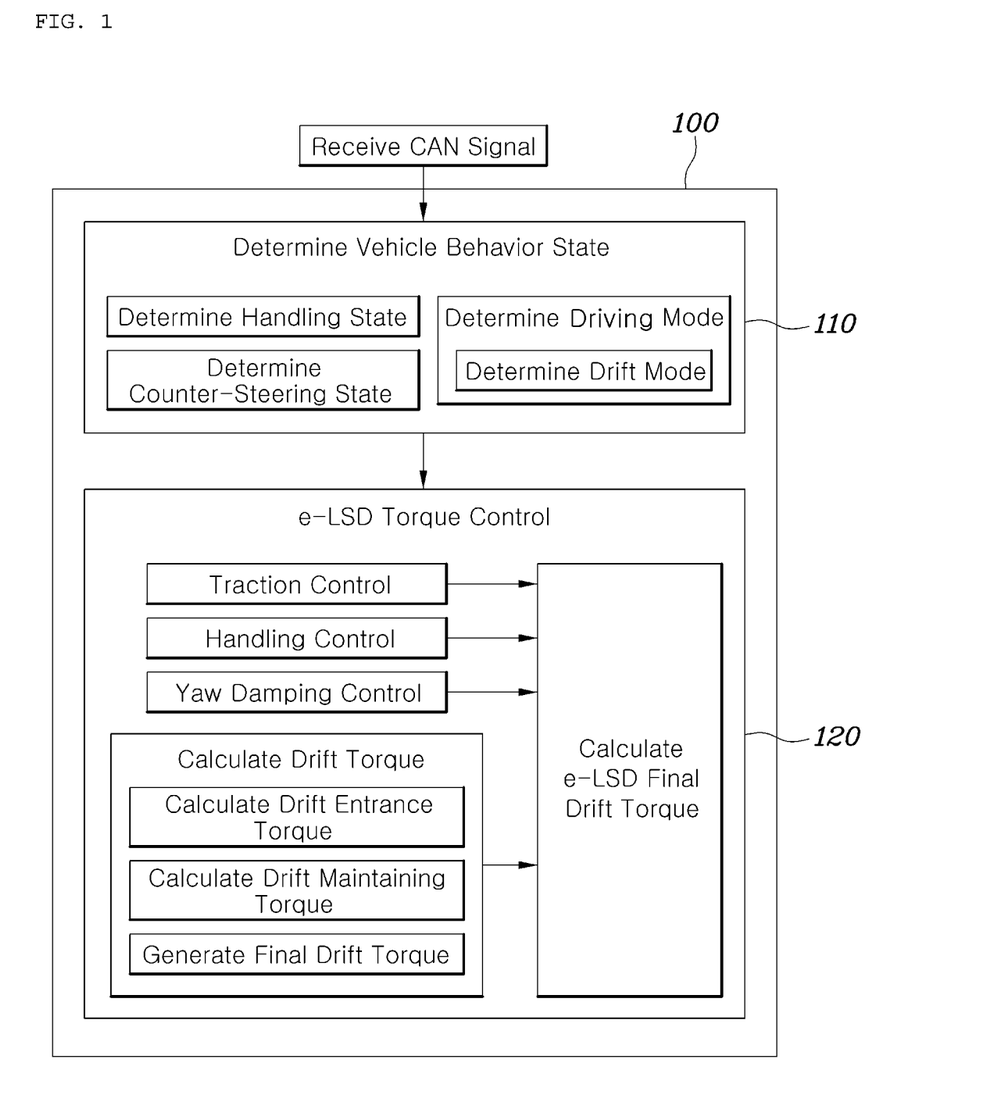
FIG. 1 is a diagram illustrating a configuration of a drift driving control system of an e-LSD according to the present disclosure.

FIG. 1 is a diagram illustrating a configuration of a drift driving control system of an electronic limited slip differential (e-LSD) according to the present disclosure.

Referring to FIG. 1, the drift driving control system according to the present disclosure is a driving control system of a rear wheel drive vehicle provided with an e-LSD, and includes: a controller 100 having a determining part 110 and a torque control part 120, the determining part 110 determining whether or not drift mode conditions are met on the basis of a driver's vehicle operating state and an output value reflecting a driving state of a vehicle; and the torque control part 120 enabling drift driving to be performed by causing the vehicle to be oversteered by increasing the driving force of the turning outer wheel by means of the e-LSD and then maintaining simultaneous slipping of the right and left wheels when the drift mode conditions are met.

Specifically, the determining part 110 receives a controller area network (CAN) signal from the vehicle and determines the behavior state of the vehicle on the basis of the driving mode of the vehicle, driver's operation information, and a variety of vehicle movement-related sensor signals.

In addition, the determining part 110 determines whether or not the drift mode conditions are met on the basis of the driver's operation information, the difference between front and rear wheel speeds, the handling state, and the counter-steering state.

Furthermore, the torque control part 120 performs traction control, handling control, and yaw damping control according to the CAN signal and the result of the determination of the behavior state of the vehicle.

In addition, when the drift mode conditions are met and behavior state of the vehicle is determined to be in a drift mode, the torque control part 120 calculates drift torque for increasing the driving force of the turning outer wheel and applies the drift torque to the turning outer wheel by means of the e-LSD so as to cause the vehicle to be oversteered, thereby facilitating the vehicle entering the drift mode.

In addition, after the vehicle has entered the drift mode, drift torque for simultaneous slipping of the right and left wheels is calculated and applied to the right and left wheels by means of the e-LSD, thereby stably maintaining the drifting state.

As described above, when the driver in the rear wheel drive vehicle intends drift driving, the present disclosure performs control to cause and maintain oversteering in the vehicle by applying suitable torque to the wheels by means of the e-LSD, thereby enabling drift driving of the vehicle. Thus, the vehicle may be driven by properly reflecting the driver's intention for drift driving.

Figure 2:
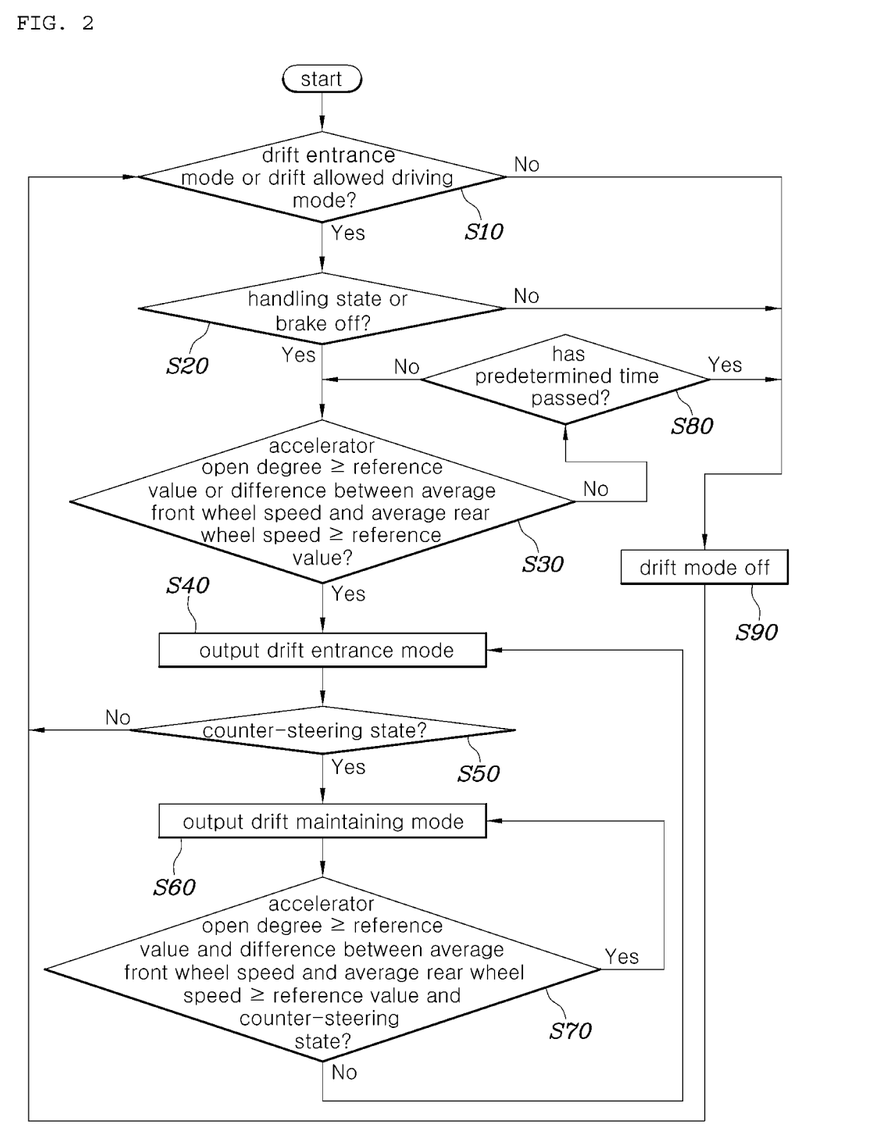
FIG. 2 is a flowchart illustrating a drift driving control process of an e-LSD according to the present disclosure.

FIG. 2 is a flowchart illustrating a drift driving control process of an e-LSD according to the present disclosure.

Referring to FIG. 2, the drift driving control process according to the present disclosure is a driving control method of a rear wheel drive vehicle provided with an e-LSD, and includes: determining, by a controller 100, whether or not drift mode conditions are met on the basis of a driver's vehicle operating state and an output value reflecting a driving state of a vehicle; and when the drift mode conditions are met, controlling, by the controller 100, drift driving to be performed by causing the vehicle to be oversteered by increasing the driving force of the turning outer wheel using the e-LSD and then maintaining simultaneous slipping of the right and left wheels.

For reference, the controller 100 according to an example embodiment may be implemented using an algorithm configured to control the operation of a variety of components of a vehicle or a non-volatile memory (not shown) configured to store data regarding software instructions for reproducing the algorithm and a processor (not shown) configured to perform operations to be described below using the data stored in the memory. Here, the memory and the processor may be implemented as separate chips. Alternatively, the memory and the processor may be integrated with a single chip.

Subsequently, the drift mode may be categorized as a drift entrance mode and a drift maintaining mode. According to the result of the determination of whether the drift mode conditions are met, a normal driving mode may be converted to the drift entrance mode or transitions between the drift entrance mode and the drift maintaining mode may be performed.

That is, when a specific condition among the drift mode conditions is met, the normal driving mode is converted to the drift entrance mode. According to a result of the determination of whether or not specific condition among the drift mode conditions is met, a transition from the drift entrance mode to the drift maintaining mode or vice versa may occur.

In addition, in the present disclosure, when the drift mode conditions based on the driving mode, steering state, brake operating state, accelerator opening degree, or difference between the average front wheel speed and the average rear wheel speed of the vehicle are met, the e-LSD may be controlled to enter the drift entrance mode.

For example, in steps S10, S20, and S30 in FIG. 2, when the driving mode of the vehicle is a sport mode, each of the steering angle and the steering angular speed of the steering wheel is equal to or greater than a predetermined value, a brake pedal operation is in an off state, and the accelerator opening degree (i.e., the degree of opening of the accelerator pedal) or the difference between the average front wheel speed and the average rear wheel speed is equal to or greater than a reference value, the drift entrance mode is output in step S40.

However, when the drift mode condition based on the difference between the average front wheel speed and the average rear wheel speed or the accelerator opening degree among the above-mentioned drift mode conditions is not met, cancellation of the drift mode may be delayed for a predetermined time.

That is, as a result of the determination of step S30, when the accelerator opening degree is less than the reference value and the difference between the average front wheel speed and the average rear wheel speed is less than the reference value, a control is performed by delaying the cancellation of the drift mode for a predetermined time in step S80, thereby facilitating reentry of the vehicle to drift driving.

For example, as the cancellation of the drift mode is delayed for the predetermined time, when the vehicle re-enters the drift mode directly after stopping drift driving as in the figure eight drift driving, it is advantageously easy to re-enter the drift mode.

In addition, according to the present disclosure, when the drift mode condition based on the counter-steering state is met, the e-LSD may be controlled to be transited to the drift maintaining mode.

For example, when the state is determined to be in a counter-steering operating state on the basis of the steering wheel state in step S50, the drift entrance mode is changed to the drift maintaining mode.

In addition, according to the present disclosure, when the drift mode conditions based on the accelerator opening degree, the difference between the average front wheel speed and the average rear wheel speed, and the counter-steering state are met, the e-LSD may be controlled to maintain the drift maintaining mode.

For example, in a state in which the mode is changed to the drift maintaining mode as in step S60, when the accelerator opening degree is equal to or greater than the reference value, the difference between the average front wheel speed and the average rear wheel speed is equal to or greater than the reference value, and the counter-steering operation is being performed, the drift driving state is maintained by maintaining the drift maintaining mode.

Here, when the drift mode condition based on the counter-steering state is not met, whether or not to enter the drift mode may be determined.

For example, in the drift entrance mode, when the state is determined to not be the counter-steering state as a result of the determination of the counter-steering operating state, the process may move to step S10 to re-determine whether or not to enter the drift mode.

Figure 3:
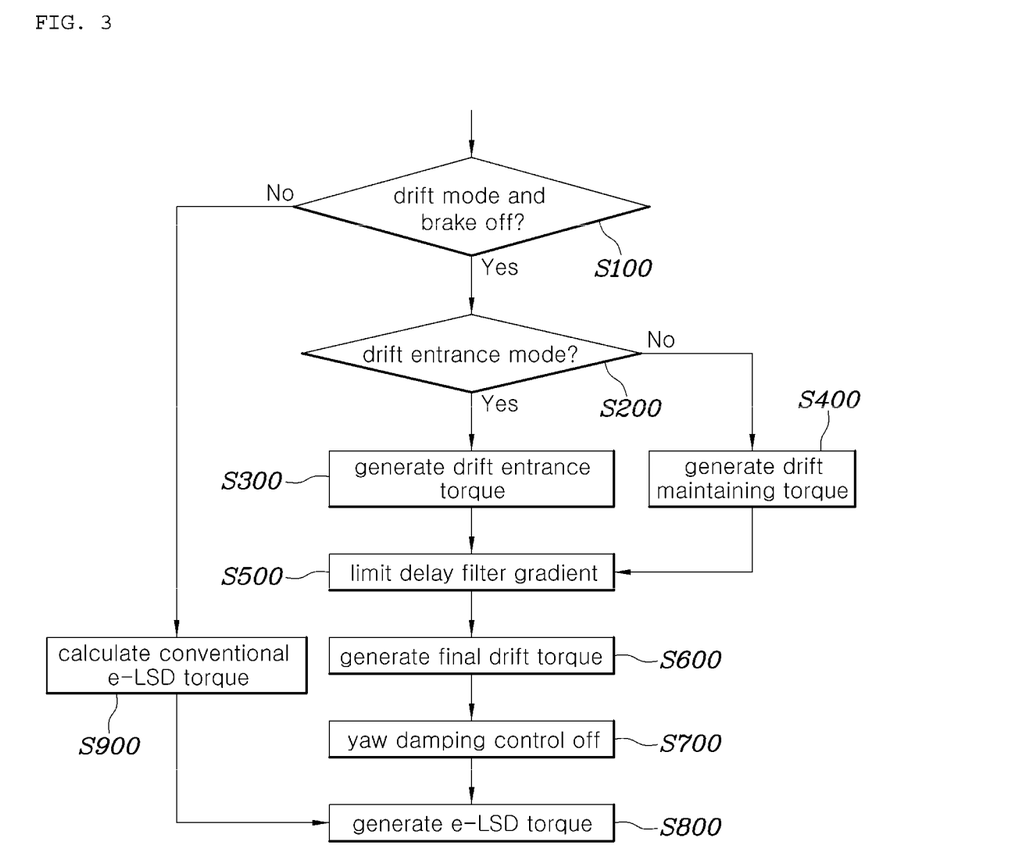
FIG. 3 is a flowchart illustrating an operation of generating drift torque according to the present disclosure.

FIG. 3 is a flowchart illustrating an operation of generating drift torque according to the present disclosure.

Referring to FIG. 3, the present disclosure may apply drift entrance torque for causing the oversteering in the vehicle by means of the e-LSD in the drift entrance mode and apply drift maintaining torque for maintaining simultaneous slipping of the right and left wheels by means of the e-LSD in the drift maintaining mode.

For example, when the current driving mode is the drift mode and the brake pedal is not being operated in step S100, a process of generating drift torque is performed.

Thus, when a process of generating the drift torque is activated in step S200, the drift torque is generated selectively in the form of drift entrance torque or drift maintaining torque according to the drift mode.

That is, in the drift entrance mode, the drift entrance torque is calculated and generated as in step S300. In the drift maintaining mode, the drift maintaining torque is calculated and generated as in step S400.

In contrast, in step S100, when the current driving mode is not the drift mode or the brake pedal is operated, the drift torque is not generated. The generated drift torque is '0', and torque for a conventional e-LSD function is calculated and generated in step S900.

That is, the oversteering may be caused and maintained in the vehicle by applying the drift entrance torque and the drift maintaining torque by means of the e-LSD according to the drift entrance mode and the drift maintaining mode.

In addition, the drift entrance torque may be determined by the driving force, the accelerator opening degree, and the vehicle speed input to the e-LSD.

For example, the drift entrance torque may be calculated by the following equation:

Drift Entrance Torque=Driving Torque Input to e-LSD×Proportional Gain of Accelerator Opening Degree×Proportional Gain of Vehicle Speed As the drift entrance torque calculated in this manner is applied to the wheels of the vehicle by means of the e-LSD, driving force that has been lost by the spin of the turning inner wheel is transferred to the turning outer wheel, thereby generating spin in the turning outer wheel.

In addition, the drift maintaining torque may be determined by the maximum value of the driving force input to the e-LSD and the allowable driving force of the turning outer wheel, lateral acceleration, and a yaw rate error.

For example, the drift maintaining torque may be calculated by the following equation:

Drift Maintaining Torque=Max of Driving Force Input to e-LSD and Allowable Driving Force of Turning Outer Wheel×Lateral Acceleration/Yaw Rate Error As the drift maintaining torque calculated in this manner is applied to the wheels of the vehicle by means of the e-LSD, simultaneous slipping of the right and left wheels of the vehicle is maintained to stably maintain the drift state. In addition, the distribution of torque to the right and left wheels is adjusted according to the transverse behavior of the vehicle when the drift is maintained, thereby reducing minute steering manipulation of the driver.

In addition, the present disclosure may apply the drift entrance torque and the drift maintaining torque by limiting the gradients thereof.

For example, when the drift entrance torque and the drift maintaining torque are calculated in step S300 and step S400 in FIG. 3, final drift torque is generated by applying a delay filter and gradient limitation in order to prevent excessive torque transition in generation of the final drift torque in step S500.

In addition, according to the present disclosure, as in step S700 in FIG. 3, the yaw damping control of the e-LSD may be stopped in the drift mode state.

That is, in drift driving, a change and a transition in the movement of the vehicle in the yawing direction occur. Thus, in a conventional e-LSD, due to the yaw damping control, torque for reducing the yaw movement of the vehicle is generated, thereby reducing the drift of the vehicle.

Accordingly, in the present disclosure, when the drift mode is entered, the yaw damping control is turned off, thereby preventing the drift of the vehicle from being reduced through the yaw damping control.

Meanwhile, the present disclosure may cancel the drift mode when the brake is operated in the drift mode state.

That is, when the driver operates the brake in the drift mode, the drift mode is immediately canceled, thereby obtaining the stability of the vehicle.

Figure 4:
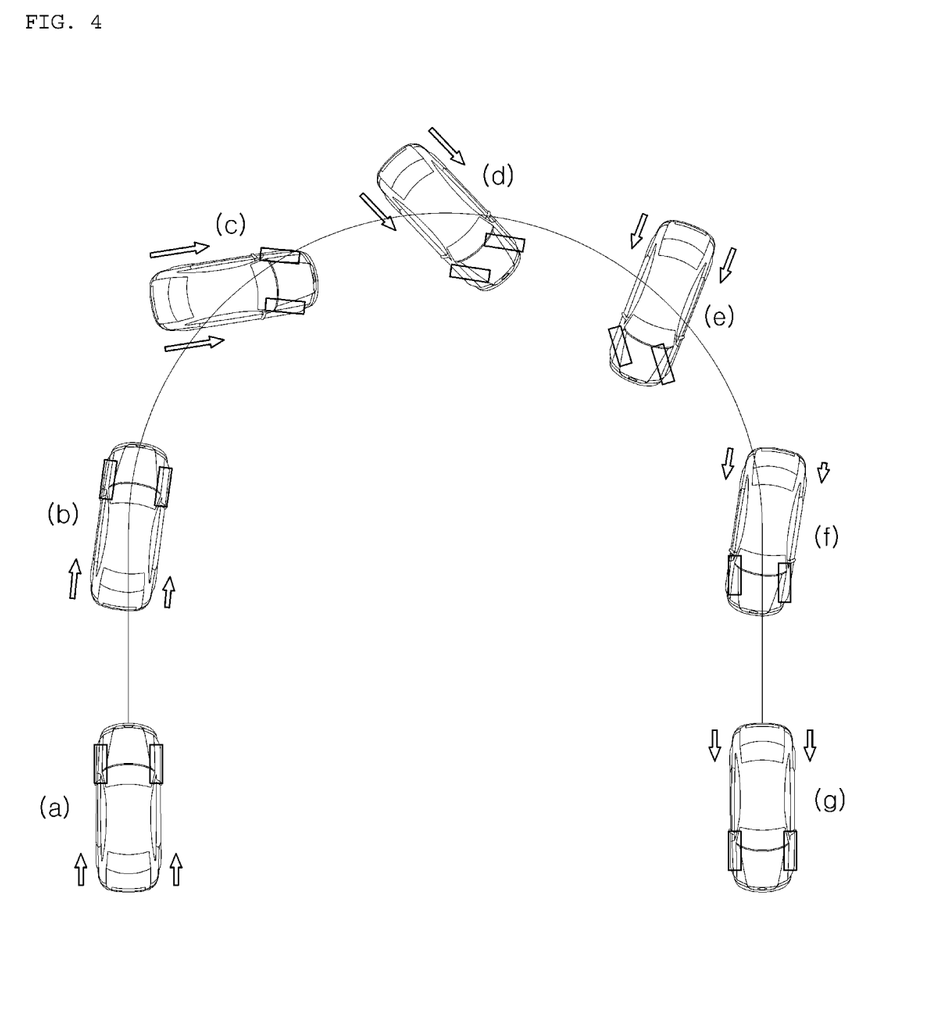
FIG. 4 is a diagram illustrating drift driving behavior of a vehicle provided with an e-LSD according to the present disclosure.

FIG. 4 is a diagram illustrating drift driving motion of a vehicle provided with an e-LSD according to the present disclosure.

Referring to FIG. 4, the drift driving operation process of the vehicle will be described. First, state (a) indicates that a vehicle is straightly driving in a sport mode. The sport mode is a driving mode in which conversion to the drift mode is allowed.

When the steering wheel is steered to the right by the drift intention of the driver, the vehicle turns to the right as in state (b), and the weight moves outward with respect to the turning. For reference, in state (b), the drift mode is not yet entered even though the steering wheel has entered the drift state for drifting.

In this case, the traction of the turning inner wheel is reduced, and when the driving force is transferred, wheel slip may occur.

Subsequently, when the driver accelerates the vehicle by pressing the accelerator pedal all the way to 100% for drift driving during the turning of the vehicle, the drift entrance mode is entered and the drift entrance torque is calculated. The calculated drift entrance torque is applied to the driving wheels by means of the e-LSD.

Then, as in state (c), the inner wheel and the outer wheel are synchronized, and torque that has been leaking due to the spin of the turning inner wheel is transferred to the turning outer wheel. Then, excessive driving force is transferred to the turning outer wheel, and the tire loses the traction and slips, thereby causing oversteering in the vehicle.

Subsequently, the driver stops excessive oversteering in the vehicle by performing a counter-steering operation to the steering wheel and adjusts the driving force of the vehicle by reducing the accelerator open degree to a level of 50%. Then, the drift entrance mode is transited to the drift maintaining mode, and drift maintaining torque is calculated.

Thus, the calculated drift entrance torque is applied to the driving wheels by means of the e-LSD, and the turning inner/outer wheel slip is maintained as in states (d) and (e), thereby stably maintain the drift state.

Consequently, when the driver reduces the driving force by operating the accelerator pedal to reduce the accelerator open degree while operating the steering wheel in a direction in which the counter-steering is cancelled, the oversteering is reduced as in state (f). Then, the amount of drift maintaining torque is gradually reduced so that the traction of the wheels is restored.

Afterwards, when the driver maintains the steering wheel in the neutral state and the accelerator open degree is reduced to 10% or lower, the drift mode is cancelled as in state (g), and the vehicle may be returned to the normal driving state.

As set forth above, according to the present disclosure, when a driver intends drift driving in a rear wheel drive vehicle, a control process may be performed to cause and maintain oversteering in the vehicle by applying suitable torque applied to the wheels of the vehicle by means of the e-LSD, thereby driving the vehicle by properly reflecting the intention of the driver for drift driving.

Furthermore, when the drift is maintained, simultaneous slipping of the right and left wheels of the vehicle may be maintained to stably maintain the drift state. In addition, the distribution of torque in the transverse direction is adjusted according to the lateral movement of the vehicle, thereby reducing minute steering manipulation of the driver.

Moreover, vehicles provided with an e-LSD may enter and maintain drift driving more easily than a vehicle without an e-LSD. Accordingly, the product quality of vehicles in terms of sport driving may be improved.

Although the exemplary embodiments of the present disclosure have been described for illustrative purposes, those skilled in the art will appreciate that various modifications, additions, and substitutions are possible, without departing from the scope and spirit of the present disclosure as disclosed in the accompanying claims.

What is claimed is:

1. A drift driving control method of an electronic limited slip differential, the method comprising:
    determining, by a controller, whether or not drift mode conditions are met on the basis of a driver's vehicle operating state or an output value reflecting a driving state of a vehicle; and
    when the drift mode conditions are met, controlling, by the controller, drift driving to be performed by causing the vehicle to be oversteered by increasing driving force of a turning outer wheel using the electronic limited slip differential and then maintaining simultaneous slipping of right and left wheels, one of which corresponds to the turning outer wheel,
    wherein a drift mode is categorized as a drift entrance mode and a drift maintaining mode,
    wherein drift entrance torque for causing the oversteering in the vehicle is applied by means of the electronic limited slip differential in the drift entrance mode, and
    drift maintaining torque for maintaining simultaneous slipping of the right and left wheels is applied by means of the electronic limited slip differential in the drift maintaining mode, and
    wherein the drift entrance torque and the drift maintaining torque are applied by limiting gradients thereof.

2. The drift driving control method of claim 1, wherein a normal driving mode is converted to the drift entrance mode or transitions between the drift entrance mode and the drift maintaining mode are performed according to a result of a determination of whether the drift mode conditions are met.

3. The drift driving control method of claim 2, wherein when the drift mode conditions based on a driving mode, a steering state, a brake operating state, an accelerator opening degree, or a difference between an average front wheel speed and an average rear wheel speed of the vehicle are met, the drift entrance mode is entered.

4. The drift driving control method of claim 2, wherein, when the drift mode conditions based on a counter-steering state is met, the electronic limited slip differential is controlled to be transited to the drift maintaining mode.

5. The drift driving control method of claim 4, wherein, when the drift mode conditions based on an accelerator opening degree, a difference between an average front wheel speed and an average rear wheel speed, and the counter-steering state are met, the drift maintaining mode is maintained.

6. The drift driving control method of claim 4, wherein, when the drift mode conditions based on the counter-steering state is not met, whether or not to enter the drift mode is determined.

7. The drift driving control method of claim 1, wherein the drift entrance torque is determined by the driving force, an accelerator opening degree, and a vehicle speed input to the electronic limited slip differential.

8. The drift driving control method of claim 1, wherein yaw damping control of the electronic limited slip differential is stopped in the drift driving.

9. The drift driving control method of claim 1, wherein the drift mode is cancelled when a brake is operated in the drift driving.

10. A drift driving control method of an electronic limited slip differential, the method comprising:
    determining, by a controller, whether or not drift mode conditions are met on the basis of a driver's vehicle operating state or an output value reflecting a driving state of a vehicle; and
    when the drift mode conditions are met, controlling, by the controller, drift driving to be performed by causing the vehicle to be oversteered by increasing driving force of a turning outer wheel using the electronic limited slip differential and then maintaining simultaneous slipping of right and left wheels, one of which corresponds to the turning outer wheel,
    wherein a drift mode is categorized as a drift entrance mode and a drift maintaining mode,
    wherein when the drift mode conditions based on a driving mode, a steering state, a brake operating state, an accelerator opening degree, or a difference between an average front wheel speed and an average rear wheel speed of the vehicle are met, the drift entered mode is entered, and
    wherein, when the drift mode conditions based on the difference between the average front wheel speed and the average rear wheel speed and the accelerator opening degree is not met, cancellation of the drift mode is delayed for a predetermined time.

11. A drift driving control method of an electronic limited slip differential, the method comprising:
    determining, by a controller, whether or not drift mode conditions are met on the basis of a driver's vehicle operating state or an output value reflecting a driving state of a vehicle; and
    when the drift mode conditions are met, controlling, by the controller, drift driving to be performed by causing the vehicle to be oversteered by increasing driving force of a turning outer wheel using the electronic limited slip differential and then maintaining simultaneous slipping of right and left wheels, one of which corresponds to the turning outer wheel,
    wherein a drift mode is categorized as a drift entrance mode and a drift maintaining mode,
    wherein drift entrance torque for causing the oversteering in the vehicle is applied by means of the electronic limited slip differential in the drift entrance mode, and
    drift maintaining torque for maintaining simultaneous slipping of the right and left wheels is applied by means of the electronic limited slip differential in the drift maintaining mode, and
    wherein the drift maintaining torque is determined by a maximum value of the driving force input to the electronic limited slip differential and allowable driving force of the turning outer wheel, lateral acceleration, and a yaw rate error.

* * * * *